US 10,183,466 B2

(12) United States Patent
Fujino et al.

(10) Patent No.: US 10,183,466 B2
(45) Date of Patent: Jan. 22, 2019

(54) TRANSPARENT ELECTROCONDUCTIVE FILM WITH PROTECTIVE FILM

(71) Applicant: NITTO DENKO CORPORATION, Ibaraki-shi, Osaka (JP)

(72) Inventors: Nozomi Fujino, Osaka (JP); Daiki Kato, Osaka (JP); Tomotake Nashiki, Osaka (JP)

(73) Assignee: NITTO DENKO CORPORATION, Ibaraki-shi, Osaka (JP)

(*) Notice: Subject to any disclaimer, the term of this patent is extended or adjusted under 35 U.S.C. 154(b) by 113 days.

(21) Appl. No.: 15/117,545

(22) PCT Filed: Nov. 10, 2015

(86) PCT No.: PCT/JP2015/081612
§ 371 (c)(1),
(2) Date: Aug. 9, 2016

(87) PCT Pub. No.: WO2016/080246
PCT Pub. Date: May 26, 2016

(65) Prior Publication Data
US 2017/0062094 A1 Mar. 2, 2017

(30) Foreign Application Priority Data
Nov. 20, 2014 (JP) .................... 2014-235284
Oct. 26, 2015 (JP) .................... 2015-209739

(51) Int. Cl.
H01B 5/14 (2006.01)
B32B 7/02 (2006.01)
(Continued)

(52) U.S. Cl.
CPC .............. B32B 7/02 (2013.01); B32B 7/12 (2013.01); B32B 9/045 (2013.01); B32B 27/28 (2013.01);
(Continued)

(58) Field of Classification Search
USPC ........................................ 428/212
See application file for complete search history.

(56) References Cited

U.S. PATENT DOCUMENTS

2009/0117405 A1* 5/2009 Nashiki ............... C23C 14/086
428/697
2013/0280554 A1* 10/2013 Yamazaki ............ C23C 14/024
428/697

FOREIGN PATENT DOCUMENTS

JP 11-268168 A 10/1999
JP 2001-332132 A 11/2001
(Continued)

OTHER PUBLICATIONS

Machine_English_translation_JP_2002210861_A; Kondo, A.; Wrapping Material for Semiconductor and Electronic Parts; Jul. 31, 2002; JPO; whole document.*

(Continued)

Primary Examiner — Tahseen Khan
(74) Attorney, Agent, or Firm — Westerman, Hattori, Daniels & Adrian, LLP

(57) ABSTRACT

A transparent electroconductive film with a protective film includes: a transparent electroconductive film including a film substrate, an optical adjustment layer formed on one main surface of the film substrate, and a transparent conductive layer formed on the optical adjustment layer; and a protective film bonded to a main surface of the film substrate on a side opposite to the transparent conductive layer, wherein the transparent electroconductive film and the protective film are thermally shrinkable in at least one direction in a main surface, and the absolute value of the maximum thermal shrinkage ratio (%) of the transparent electroconductive film in a main surface is smaller than the absolute value of the maximum thermal shrinkage ratio (%) of the
(Continued)

protective film in a main surface, and the difference between the absolute values is 0.05% to 0.6%.

21 Claims, 4 Drawing Sheets

(51) Int. Cl.
    *B32B 7/12*     (2006.01)
    *B32B 9/04*     (2006.01)
    *B32B 27/28*     (2006.01)
    *B32B 27/30*     (2006.01)
    *B32B 27/32*     (2006.01)
    *B32B 27/34*     (2006.01)
    *B32B 27/36*     (2006.01)
    *G02B 1/14*     (2015.01)

(52) U.S. Cl.
    CPC .......... *B32B 27/281* (2013.01); *B32B 27/302* (2013.01); *B32B 27/32* (2013.01); *B32B 27/325* (2013.01); *B32B 27/34* (2013.01); *B32B 27/36* (2013.01); *B32B 27/365* (2013.01); *G02B 1/14* (2015.01); *B32B 2255/10* (2013.01); *B32B 2255/26* (2013.01); *B32B 2307/202* (2013.01); *B32B 2307/306* (2013.01); *B32B 2307/412* (2013.01); *B32B 2307/584* (2013.01); *B32B 2307/704* (2013.01); *B32B 2307/732* (2013.01); *B32B 2307/736* (2013.01); *B32B 2457/208* (2013.01)

(56) References Cited

FOREIGN PATENT DOCUMENTS

| JP | 2002210861 A | * | 7/2002 | |
|----|---|---|---|---|
| JP | 2005166427 A | * | 6/2005 | |
| JP | 5245893 B | | 7/2013 | |
| JP | 2014-209440 A | | 11/2014 | |
| WO | WO-2015151203 A1 | * | 10/2015 | ............... B32B 7/12 |

OTHER PUBLICATIONS

Machine_English_translation_JP_2005166427_A; Masuda, A.; Transparent Conductive Film and Manufacturing Method of the Same; Jun. 23, 2005; JPO; whole document.*

Shoshi, Satoru; Protective Film and Protective-Film-Attached Film on Which Transparent Conductive Film is to be Laminated; Oct. 8, 2015; EPO; whole document (Year: 2015).*

International Search Report dated Feb. 16, 2016, issued in counterpart international application No. PCT/JP2015/081612(1 page).

* cited by examiner

TRANSPARENT ELECTROCONDUCTIVE FILM WITH PROTECTIVE FILM

BACKGROUND OF THE INVENTION

Field of the Invention

The present invention relates to a transparent electroconductive film with a protective film.

Description of the Related Art

A transparent electroconductive film including a film substrate, and an optical adjustment layer and a transparent conductive layer formed on one main surface of the film substrate has been heretofore known. Transparent electroconductive films are used in touch panels and so on. As one example of a method for improving scratch resistance of a transparent electroconductive film, an optical adjustment layer is formed by a dry film formation method, typically a sputtering method. Typically, a transparent electroconductive film is produced by a roll-to-roll method in which layers are continuously formed on a long film substrate.

The transparent electroconductive film, which is wound in the form of a roll, is cut in the form of a sheet having a predetermined shape and size, and subjected to a heating treatment for crystallizing the transparent conductive layer. Thereafter, the transparent electroconductive film may be post-processed for forming fine wiring by patterning or etching. In this connection, Japanese Patent No. 5245893 discloses a technique in which a protective film is provided on the other main surface of the film substrate for facilitating the handling of a sheet of the transparent electroconductive film.

However, a sheet of the transparent electroconductive film with a protective film, which is excellent in scratch resistance, has a problem that curl (warp) is developed with time after the heating treatment, and the curl grows gradually. When the curl grows, it becomes difficult to handle a sheet of the transparent electroconductive film with a protective film in a process for production of a touch panel device (e.g. a step of heating and crystallizing a transparent conductive layer and a step of bonding to other materials). Since conventional touch panels are mostly used in applications of small devices, typically mobile phones, curl is commonly evaluated with a sheet having a small size (e.g. 10 cm×10 cm), and a problem with curl is not obvious. In recent years, however, curl is apt to be developed on a larger scale with as increase in size of touch panels (to, for example, A4 size or larger), and thus a problem with curl is obvious. For example, there may be cases where, as a result of cutting the same transparent electroconductive film with a protective film to a size of 10 cm×10 cm and a size of 50 cm×50 cm and evaluating curl for each of the sheets, curl in the sheet with a size of 10 cm×10 cm is at a sufficiently low level (e.g. 5 mm), whereas curl in the sheet with a size of 50 cm×50 cm is very large (e.g. 20 mm).

On the other hand, there has been heretofore a transparent electroconductive film including an optical adjustment layer formed by a wet film formation method, typically a coating method. A transparent electroconductive film including an optical adjustment layer formed by a wet film formation method is almost free from the above-mentioned problem with curl even when provided with a protective film similar to that described above. However, a transparent electroconductive film including an optical adjustment layer formed by a wet film formation method has a problem of poor scratch resistance. Accordingly, a transparent electroconductive film which has high scratch resistance and which is free from a problem with curl is desired.

PRIOR ART DOCUMENT

Patent Document

Patent document 1: JP Patent No. 5245893 B

SUMMARY OF THE INVENTION

An object of the present invention is to provide a transparent electroconductive film which has high scratch resistance and which does not curl to a problematic level when being in the form of a sheet.

The present inventors have extensively conducted studies on the above-mentioned problems, and resultantly found that when the absolute value of the maximum thermal shrinkage ratio of a transparent electroconductive film is in a specific range below the absolute value of the maximum thermal shrinkage ratio of a protective film, the above-mentioned problems are solved, leading to completion of the present invention. The thermal shrinkage ratio of the transparent electroconductive film may vary depending on a direction in a main surface. In this case, the maximum thermal shrinkage ratio in the main surface is used as the thermal shrinkage ratio of the transparent electroconductive film. The same applies to the thermal shrinkage ratio of the protective film.

(1) A transparent electroconductive film with a protective film according to a first preferred aspect of the present invention includes a transparent electroconductive film including a laminate, which includes a film substrate, and at least an optical adjustment layer and a transparent conductive layer in this order on one main surface of the film substrate. The transparent electroconductive film includes a protective film bonded to a main surface of the film substrate on a side opposite to the transparent conductive layer. The optical adjustment layer includes a sputtered layer. The transparent electroconductive film and the protective film are thermally shrinkable in at least one direction in a main surface. The absolute value of the maximum thermal shrinkage ratio (%) of the transparent electroconductive film in a main surface is smaller than the absolute value of the maximum thermal shrinkage ratio (%) of the protective film in a main surface, and the difference between the absolute values is 0.05% to 0.6%.

(2) A transparent electroconductive film with a protective film according to a second preferred aspect of the present invention includes a transparent electroconductive film including a laminate, which includes a film substrate, and at least an optical adjustment layer and a transparent conductive layer in this order on one main surface of the film substrate. The transparent electroconductive film includes a protective film bonded to a main surface of the film substrate on a side opposite to the transparent conductive layer. The optical adjustment layer includes a region having a carbon atom content of 0.2 atomic % or less in a thickness direction. The transparent electroconductive film and the protective film are thermally shrinkable in at least one direction in a main surface. The absolute value of the maximum thermal shrinkage ratio (%) of the transparent electroconductive film in a main surface is smaller than the absolute value of the maximum thermal shrinkage ratio (%) of the protective film in a main surface, and the difference between the absolute values is 0.05% to 0.6%.

(3) A transparent electroconductive film with a protective film according to a third preferred aspect of the present invention includes a transparent electroconductive film including a laminate, which includes a film substrate, and at least an optical adjustment layer and a transparent conductive layer in this order on one main surface of the film substrate. The transparent electroconductive film includes a protective film bonded to a main surface of the film substrate on a side opposite to the transparent conductive layer. The moisture permeability of the optical adjustment layer is 1.0 g/m²·day or less. The transparent electroconductive film and the protective film are thermally shrinkable in at least one direction in a main surface. The absolute value of the maximum thermal shrinkage ratio (%) of the transparent electroconductive film in a main surface is smaller than the absolute value of the maximum thermal shrinkage ratio (%) of the protective film in a main surface, and the difference between the absolute values is 0.05% to 0.6%.

(4) In the transparent electroconductive film with a protective film according to a fourth preferred aspect of the present invention, the absolute value of curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is 2.1% or less of the diagonal length of the sheet throughout exposure time.

(5) In the transparent electroconductive film with a protective film according to a fifth preferred aspect of the present invention, the absolute value of curl developed when the transparent electroconductive film with a protective film is cut into a square or rectangular sheet with an area of 600 cm² or more, the sheet is heated at a temperature of 140° C. for 90 minutes, and subsequently exposed to an environment at a temperature of 25° C. and a relative humidity of 55% for 1 minute to 4 hours is 15 mm or less throughout exposure time.

(6) In the transparent electroconductive film with a protective film according to a sixth preferred aspect of the present invention, the interlayer adhesive strength between the protective film and the film substrate is smaller than the interlayer adhesive strength between any other pair of adjacent layers.

(7) In the transparent electroconductive film with a protective film according to a seventh preferred aspect of the present invention, the moisture permeability of the transparent electroconductive film at a temperature of 40° C. and a relative humidity of 90% is 1.0 g/m²·day or less.

(8) In the transparent electroconductive film with a protective film according to an eighth preferred aspect of the present invention, the measured value of curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is a negative value as an average of measured values of curl at four corners of the sheet, throughout the exposure time, where the measured value of curl toward the transparent electroconductive film side is a positive value and the measured value of curl toward the protective film side is a negative value.

(9) In the transparent electroconductive film with a protective film according to a ninth preferred aspect of the present invention, curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is in a direction toward the protective film side at four corners of the sheet throughout the exposure time.

(10) In the transparent electroconductive film with a protective film according to a tenth preferred aspect of the present invention, the film substrate and the protective film are each formed of polyethylene terephthalate, and in each of the film substrate and the protective film, the thermal shrinkage ratio in the MD (machine direction) (flow direction) is the maximum thermal shrinkage ratio.

The present invention provides a transparent electroconductive film which has high scratch resistance and which does not curl to a problematic level when being in the form of a sheet.

DESCRIPTION OF THE PREFERRED EMBODIMENTS

Figure 1:
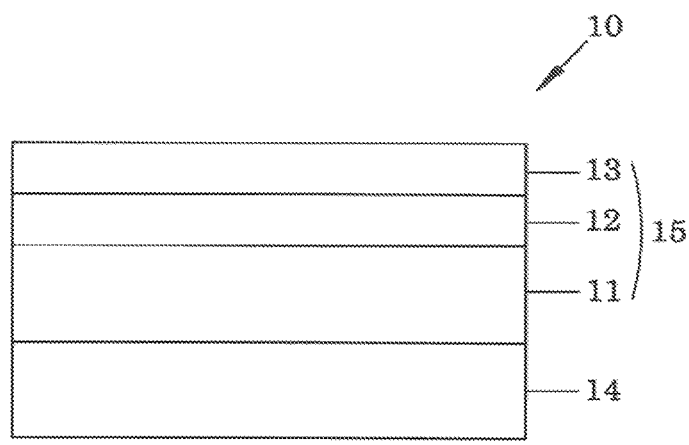
FIG. 1 is a schematic view of a transparent electroconductive film with a protective film of the present invention.

Transparent Electroconductive Film with Protective Film of the Present Invention FIG. 1 is a schematic view of cue example of a transparent electroconductive film 10 with a protective film of the present invention. In the transparent electroconductive film 10 with a protective film in FIG. 1, an optical adjustment layer 12 is formed on one main surface of a film substrate 11, and a transparent conductive layer 13 is formed on the optical adjustment layer 12. A protective film 14 is bonded to a main surface of the film substrate 11 on a side opposite to the transparent conductive layer 13 with, for example, a pressure sensitive adhesive (not illustrated). A laminate of the film substrate 11, the optical adjustment layer 12 and the transparent conductive layer 13 is referred to as a transparent electroconductive film 15. The transparent electroconductive film 15 and the protective film 14 are usually composed of a resin film. The resin film is easily dimensionally changed when heated, and is easily thermally shrinkable in general in at least one direction in a main surface. Accordingly, the transparent electroconductive film 15 and the protective film 14 are easily thermally shrinkable in at least one direction in a main surface. The absolute value of the maximum thermal shrinkage ratio of the transparent electroconductive film 15 is smaller than the absolute value of the maximum thermal shrinkage ratio of the protective film 14. The thermal shrinkage ratio of the transparent electroconductive film 15 is dominated by the thermal shrinkage ratio of the film substrate 11 having an overwhelmingly large thickness.

The thermal shrinkage ratio of the film substrate 11 may vary depending on a direction in the main surface. Accordingly, the thermal shrinkage ratio of the transparent electroconductive film 15 may vary depending on a direction in the main surface. As the maximum thermal shrinkage ratio of the transparent electroconductive film 15, a thermal shrinkage ratio that is the highest in the main surface is used. The thermal shrinkage ratio of the protective film 14 may also vary depending on a direction in the main surface. As the maximum thermal shrinkage ratio of the protective film 14, a thermal shrinkage ratio that is the highest in the main surface is used.

The maximum thermal shrinkage ratio of the transparent electroconductive film 10 with a protective film is preferably 0.06% to 0.68%, more preferably 0.10% to 0.64%, further preferably 0.10% to 0.54%. When the maximum thermal shrinkage ratio is in the above-Mentioned range, fine wiring processing of the transparent conductive layer 13 can be accurately performed even when a heating step is carried out.

[Film Substrate]

The film substrate 11 is formed of, for example, polyethylene terephthalate, polyethylene naphthalate, polyolefin, polycycloolefin, polycarbonate, polyether sulfone, polyallylate, polyimide, polyamide, polystyrene, norbornene or the like. While the material of the film substrate 11 is not limited to those described above, polyethylene terephthalate which is excellent in transparency, heat resistance and mechanical characteristics is especially preferable.

The thickness of the film substrate 11 is, for example, not less than 20 μm and not more than 300 μm, preferably more than 40 μm and not more than 300 μm, but the thickness of the film substrate 11 is not limited thereto. However, when the thickness of the film substrate 11 is less than 20 μm, handling may be difficult. When the thickness of the film substrate 11 is more than 300 μm, a problem may occur that the thickness of the transparent electroconductive film 15 is excessively large when it is mounted in a touch panel or the like.

The moisture permeability of the film substrate 11 is, for example, 3 g/m$^2$·day or more. A surface of the film substrate 11 on the transparent conductive layer 13 side and a surface of the film substrate 11 on the protective film 14 side may be provided with a functional layer such as an easily bondable layer, an undercoat layer or a hard coat layer (not illustrated) as necessary. The easily bondable layer serves to improve adhesion between the film substrate 11 and a layer (e.g. the optical adjustment layer 12) formed on the film substrate 11. The undercoat layer serves to adjust the reflectance and the optical color phase of the film substrate 11. The hard coat layer improves the scratch resistance of the transparent electroconductive film 15. Preferably, the functional layer contains an organic resin.

The maximum thermal shrinkage ratio of the film substrate 11 is preferably 0.05% to 0.65%, more preferably 0.10% to 0.60%, further preferably 0.10% to 0.50%. When the maximum thermal shrinkage ratio of the film substrate 11 is less than 0.05%, the compressive stress of the transparent conductive layer 13 may be excessively small, leading to deterioration of the humidification resistance reliability of the transparent conductive layer 13. When the maximum thermal shrinkage ratio of the film substrate 11 is more than 0.65%, the positional accuracy of wiring may be considerably deteriorated in formation of wiring by patterning the transparent conductive layer 13.

[Transparent Conductive Layer]

The transparent conductive layer 13 is a thin-film layer mainly composed of a conductive oxide of a metal, or a transparent thin-film layer mainly composed of a composite metal oxide containing a main metal and at least one impurity metal. The constituent material of the transparent, conductive layer 13 is not particularly limited as long as it has optical transparency in a visible light region, and has conductivity.

For the transparent, conductive layer 13, for example, indium oxide, indium tin oxide (ITO), indium zinc oxide (IZO), indium gallium zinc oxide (IGZO) or the like is used, and indium tin oxide is more preferable from the viewpoint of a low resistivity and a transparent color phase. The transparent conductive layer 13 may be amorphous or crystalline, but it is more preferably crystalline.

Whether the transparent conductive layer 13 is crystalline or not can be determined by performing plane TEM observation using a transmission electron microscope (TEM). In this specification, the transparent conductive layer 13 is considered amorphous when the area ratio of crystal grains in a plane TEM image at a magnification of 25,000 is 50% or less (preferably not less than 0% and not more than 30%), and the transparent conductive layer 13 is considered crystalline when the area ratio of crystal grains in the image is more than 50% (preferably 80% or more).

The crystalline transparent conductive layer 13 is excellent in moisture-and-heat resistance reliability. The crystalline transparent conductive layer 13 has crystal grain boundaries, is therefore easily permeable to water through the grain boundaries, and can have an increased moisture permeability as compared to an amorphous transparent conductive layer. The moisture permeability of the transparent conductive layer 13 is, for example, 1 g/m$^2$·day. The crystalline transparent conductive layer may be inferior in scratch resistance to an amorphous transparent conductive layer. However, since the transparent electroconductive film 15 of the present application includes the optical adjustment layer 12 excellent in scratch resistance, the crystalline transparent conductive layer 13 can be suitably used. An indium tin oxide layer formed on the film substrate 11 at a low temperature is amorphous, and is converted to a crystalline state from an amorphous state when subjected to a heating treatment. The indium tin oxide layer has a reduced surface resistance value when converted to a crystalline state.

The resistivity of the transparent conductive layer 13 is preferably $4 \times 10^{-4}$ Ω·cm or less, more preferably $3.8 \times 10^{-4}$ Ω·cm or less, further preferably $3.5 \times 10^{-4}$ Ω·cm or less, most preferably $3.3 \times 10^{-4}$ Ω·cm or less, and the lower limit thereof is, for example, $1 \times 10^{-4}$ Ω·cm. The transparent conductive layer 13 can also be suitably used as a transparent electrode for a large touch panel by reducing its resistivity. When the resistivity of the transparent conductive layer 13 is low, it is no longer necessary to excessively increase the thickness of the transparent conductive layer, so that the light transmittance of the transparent conductive layer 13 can be made higher. When the thickness of the transparent conductive layer 13 is reduced, its scratch resistance may be deteriorated. However, since the transparent electroconductive film 15 of the present application includes the optical adjustment layer 12 excellent in scratch resistance, the thin transparent conductive layer 13 having a low resistivity can be suitably used. The resistivity of the transparent conductive layer 13 can be determined from the surface resistance value (Ω/□) of the transparent conductive layer 13 as measured by a four-terminal method and the thickness of the transparent conductive layer 13 as measured with a transmission electron microscope in accordance with JIS K7194 (1994). The surface resistance value of the transparent conductive layer 13 is preferably 200Ω/□ or less, more preferably 150Ω/□ or less, further preferably 100Ω/□ or less, and the lower limit thereof is, for example, 40Ω/□. When the surface resistance value of the transparent conductive layer 13 is in the above-mentioned range, the transparent conductive layer 13 can also be used as a transparent electrode for a large touch panel.

[Protective Film]

The protective film 24 is formed of, for example, polyethylene terephthalate, polyethylene naphthalate, polyolefin, polycycloolefin, polycarbonate, polyether sulfone, polyallylate, polyimide, polyamide, polystyrene, norbornene or the like. While the material of the protective film 14 is not limited to those described above, polyethylene terephthalate which is excellent in transparency, heat resistance and mechanical characteristics is especially preferable.

The thickness of the protective film 14 is not particularly limited as long as it is such a thickness that the transparent, electroconductive film 10 with a protective film can be properly handled, but it is preferably not less than 20 μm and not more than 300 μm, more preferably not less than 40 μm and not more than 300 μm. When the thickness of the protective film 14 is less than 20 μm, handling may be difficult. When the thickness of the protective film 14 is more than 300 μm, winding may be difficult.

The ratio (Ts/Tp) between the thickness Tp of the protective film 14 and the thickness Ts of the film substrate 11 is preferably 0.1 to 3.0, more preferably 0.3 to 2.0, further preferably 0.3 to 1.5. When the ratio (Ts/Tp) is in the above-mentioned range, the handling characteristics of the transparent electroconductive film 10 with a protective film can be reliably improved.

The moisture permeability of the protective film 14 is, for example, 3 g/m²·day or more. The maximum thermal shrinkage ratio of the protective film 14 is preferably 0.10% to 0.70%, more preferably 0.15% to 0.65%, further preferably 0.15% to 0.55%. When the maximum thermal shrinkage ratio of the protective film 14 is in the above-mentioned range, there is no fear of deterioration of various kinds of characteristics of the transparent electroconductive film 15.

The protective film 14 is bonded to the film substrate 11 with, for example, a pressure sensitive adhesive (not illustrated). The protective film 14 in the present invention should be separated from the film substrate 11 at the time of bonding the transparent electroconductive film 15 to, for example, a touch panel member. Here, if the optical adjustment layer 12 peels off the film substrate 11, or the transparent conductive layer 13 peels off the optical adjustment layer 12, the transparent electroconductive film 15 is broken. For preventing such a situation, the interlayer adhesive strength between the protective film 14 and the film substrate 11 should be smaller than the interlayer adhesive strength between any other pair of adjacent layers. The interlayer adhesive strength may be appropriately set in such a range that the optical adjustment layer 12 does not peel off the film substrate 11 and the transparent conductive layer 13 does not peel off the optical adjustment layer 12 when the protective film 14 is separated from the film substrate 11. For example, the interlayer adhesive strength is preferably 3 N/50 mm or less. The peel strength of the protective film can be measured by a 180° peeling test conforming to JIS Z0237.

The protective film 14 in this specification is ultimately separated and discarded at the time of incorporating the transparent electroconductive film in a touch panel. Preferably, the film substrate 11 and the protective film 14 are separated from each other in a state in which a pressure sensitive adhesive or the like that has existed at the interface remains on the protective film 14. When the film substrate 11 and the protective film 14 are separated from each other with a pressure sensitive adhesive remaining on the film substrate 11, the uses of the transparent electroconductive film are limited. When a pressure sensitive adhesive or the like is left on the protective film which is ultimately separated and discarded, the transparent electroconductive film 15 is hard to be adversely affected in use even if a failure of the pressure sensitive adhesive or the like (e.g. foaming of the pressure sensitive adhesive by heating) occurs.

[Optical Adjustment Layer]

The optical adjustment layer 12 is a layer that is provided between the film substrate 11 and the transparent conductive layer 13 and intended for adjusting the refractive index. Due to existence of the optical adjustment layer 12, the optical characteristics (e.g. reflection characteristics) of the transparent electroconductive film 15 can be optimized. The optical adjustment layer 12 is a dry optical adjustment layer that is formed on the film substrate 11 by a dry film formation method, and the optical adjustment layer 12 contains an inorganic oxide. Preferably, the optical adjustment layer 12 is formed of an inorganic oxide. The method for forming the optical adjustment layer 12 is not limited as long as it is a dry film formation method which ensures that sufficient scratch resistance is achieved, but particularly a sputtering method is preferable. In a sputtering method, a particularly dense film can be stably formed in comparison with other dry film formation methods (e.g. a vacuum vapor deposition method), and therefore the optical adjustment layer 12 including an inorganic oxide layer formed by a sputtering method has excellent scratch resistance.

The pressure of a sputtering gas in formation of the optical adjustment layer 12 by a sputtering method is preferably 0.05 Pa to 0.5 Pa, more preferably 0.09 Pa to 0.3 Pa. When the pressure of a sputtering gas is in the above-mentioned range, a denser layer can be formed. When the pressure of a sputtering gas is more than 0.5 Pa, it may be impossible to obtain a dense layer. When the pressure of a sputtering gas is less than 0.05 Pa, discharge may be no longer stable, leading to deterioration of the optical characteristics (e.g. transmittance) of the transparent electroconductive film 15.

The constituent material of the optical adjustment layer 12 is not particularly limited, and examples thereof include inorganic oxides such as silicon oxides (silicon monoxide (SiO), silicon dioxide ($SiO_2$ that is usually called silicon oxide), silicon suboxide ($SiO_x$: x is not smaller than 1 and smaller than 2)), aluminum oxide ($Al_2O_3$), niobium oxide ($Nb_2O_5$), zirconium oxide ($ZrO_2$) and titanium oxide ($TiO_2$). The optical adjustment layer 12 may be a single inorganic oxide layer, or an inorganic oxide layer laminate formed by laminating a plurality of inorganic oxide layers having different main atoms. The dry optical adjustment layer 12 containing an inorganic oxide has scratch resistance higher than that of a wet optical adjustment layer 22 (FIG. 3), the description of which will be given later), so that the fine wiring pattern of the transparent conductive layer 13 is inhibited from being broken by scratching.

For ensuring that the optical adjustment layer 12 is excellent in scratch resistance, the moisture permeability of the optical adjustment layer 12 is, for example, 1.0 g/m²·day or less, preferably 0.8 g/m²·day or less, more preferably 0.6 g/m²·day, further preferably 0.4 g/m²·day or less, and on the other hand, the moisture permeability of the optical adjustment layer 12 is, for example, 0.001 g/m²·day or more, preferably 0.01 g/m²·day or more. Thus, the moisture permeability of the optical adjustment layer 12 is at least an order of magnitude smaller than the moisture permeability of each of the film substrate 11 and the protective film 14. When the moisture permeability of the optical adjustment layer 12 is in the above-mentioned range, the inorganic oxide layer has a sufficiently high layer density, and therefore sufficient scratch resistance can be achieved. When the moisture permeability of the optical adjustment layer 12 is less than 0.001 g/m²·day, the layer density of the inorganic oxide layer may be excessively increased to excessively increase the hardness, leading to deterioration of bending resistance. When the moisture permeability of the optical adjustment layer 12 is more than 1.0 g/m²·day, the layer density may be insufficient, leading to deterioration of scratch resistance. Preferably, the optical adjustment layer 12 has the lowest moisture permeability among the layers that form the transparent electroconductive film 15, so that the optical adjustment layer 12 has a sufficiently high layer density, and thus the transparent electroconductive film 15 that is excellent in scratch resistance can be obtained.

Preferably, the optical adjustment layer 12 has a region which contains substantially no impurity atoms other than inorganic atoms and oxygen atoms that form the inorganic oxide, specifically a region which has a carbon atom content of 0.2 atomic % or less. Carbon atoms that may be contained in the optical adjustment layer 12 are, for example, impurity atoms originating from the film substrate 11 or a hard coat, layer (not illustrated) formed on the film substrate 11 by a wet process. The wet optical adjustment layer 22 (FIG. 3, the description of which will be given later) may contain carbon atoms originating from an organic resin.

In this specification, presence/absence of a region having a carbon atom content of 0.2 atomic % or less can be determined by performing depth profile measurement by X-ray photoelectron spectroscopy (commonly called ESCA: electron spectroscopy for chemical analysis).

Carbon atoms reduce the layer density of the optical adjustment layer 12, leading to deterioration of scratch resistance. When the optical adjustment layer 12 has a region having a carbon atom content of 0.2 atomic % or less, sufficient scratch resistance can be achieved. The lower the content of carbon atoms in the optical adjustment layer 12, the better, but when the carbon atom content is 0.2 atomic % or less in X-ray photoelectron spectroscopy, it may be impossible, to detect carbon atoms because the content of carbon atoms is below the device detection limit. Thus, in this specification, it is determined that the optical adjustment layer 12 contains substantially no impurity atoms when the content of carbon atoms is 0.2 atomic % or less. Where the total thickness of the optical adjustment, layer 12 (i.e. the total thickness of the dry optical adjustment layer) is 100%, the ratio of the thickness of the region having a carbon atom content of 0.2 atomic % or less is, for example, 10% or more, preferably 15% or more, more preferably 20% or more, further preferably 2 5% or more, most preferably 30% or more. The method for determining the ratio of the "region having a carbon atom content of 0.2 atomic % or less" will be described in detail in the section [Evaluation of region where impurity atoms (carbon atoms) exist in optical adjustment layer]. The ratio of the region having a carbon atom content of 0.2 atomic % or less is determined in the following manner: the total thickness A (nm) of a dry optical adjustment layer and the thickness B (nm) of a region where carbon atoms are detected in the dry optical adjustment layer are determined, and the formula "100−(B/A)×100" (unit: %) is calculated. When the ratio of the region having a carbon atom content of 0.2 atomic % or less is 10% or more, sufficient scratch resistance is achieved. The higher the ratio of the region having a carbon atom content of 0.2 atomic % or less, the better, but practically, an analysis result showing that the ratio of the above-mentioned region is 100% cannot be obtained because there is an analytical problem, e.g. carbon atoms that form the film substrate 11 are detected in a part of the optical adjustment layer 12 in the vicinity of the film substrate 11. The upper limit of the ratio of the region having a carbon atom content of 0.2 atomic % or less is, for example, 90%.

The optical adjustment layer 12 which does not contain impurity atoms can be suitably formed, for example, under such a condition that the temperature of the film substrate 11 is not excessively elevated. For example, the optical adjustment layer 12 is formed while a surface of the film substrate 11 on a side opposite to a surface on which the optical adjustment layer 12 is formed is cooled to −20° C. to 15° C., preferably −20° C. to 5° C. By forming the optical adjustment layer 1.2 while cooling the film substrate 11, release of gas components contained in the film substrate is suppressed, so that the optical adjustment layer 12 is hard to contain impurity atoms.

The thickness of the optical adjustment layer 12 is, for example, 1 nm or more, preferably 5 nm or more, more preferably 8 nm or more, further preferably 10 nm or more, and on the other hand, the thickness of the optical adjustment layer 12 is, for example, 200 nm or less, preferably 100 nm or less, further preferably 80 nm or less, most preferably 50 nm or less. When the thickness of the optical adjustment layer 12 is less than 1 nm, the scratch resistance of the transparent electroconductive film 15 may be insufficient. When the thickness of the optical adjustment layer 12 is more than 200 nm, the bending resistance of the transparent electroconductive film 15 may be deteriorated.

[Moisture Permeability of Transparent Electroconductive Film]

The moisture permeability of the transparent electroconductive film 15 at a temperature of 40° C. and a relative humidity of 90% is preferably 1.0 g/m²·day or less, more preferably 0.5 g/m²·day or less. When the moisture permeability is more than 1.0 g/m²·day, the humidification resistance reliability of the transparent conductive layer 13 may be deteriorated.

[Difference Between Maximum Thermal Shrinkage Ratio of Transparent Electroconductive Film and Maximum Thermal Shrinkage Ratio Of Protective Film]

The difference between the absolute value of the maximum thermal shrinkage ratio of the transparent electroconductive film 15 and the absolute value of the maximum thermal shrinkage ratio of the protective film 14 is preferably 0.05% to 0.6%, more preferably 0.05% to 0.5%, further preferably 0.05% to 0.4%, most preferably 0.1% to 0.4%. Accordingly, curl in a sheet of the transparent electroconductive film 10 with a protective film can be controlled to fall within an appropriate range. The maximum thermal shrinkage ratios of the film substrate 11 and the protective film 14 may be negative (the film substrate 11 and the protective film 14 may be thermally expanded) depending on materials, and drawing histories and directions of the film substrate 11 and the protective film 14. Accordingly, a comparison is made between the absolute values of the maximum thermal shrinkage ratios.

The maximum thermal shrinkage ratio of the transparent electroconductive film 15 in the main surface is preferably equal to the absolute value of the maximum size change ratio of the transparent electroconductive film 15 in the main surface. The transparent electroconductive film 15 may thermally shrink in a direction (e.g. MD: machine direction), and thermally expand in another direction (e.g. TD: transverse direction) in the main surface. The maximum thermal shrinkage ratio being equal to the absolute value of the maximum size change ratio means that the absolute value of the maximum thermal shrinkage ratio is larger than the absolute value of the maximum thermal expansion ratio.

For example, when the transparent electroconductive film 15 shows a maximum thermal shrinkage ratio of 1.0% in the MD and a maximum thermal expansion ratio of 0.5% in the TD in the main surface, the maximum thermal shrinkage ratio (1.0%) is larger than the maximum thermal expansion ratio (0.5%), and the maximum thermal shrinkage ratio is equal to the absolute value of the maximum size change ratio.

The maximum thermal shrinkage ratio being equal to the absolute value of the maximum size change ratio means that the value of the thermal shrinkage ratio is a positive value (not thermal expansion) suggesting that the dominant factor of a size change by heating is thermal shrinkage. In the main surface of the transparent electroconductive film 15, when the dominant factor of a size change is thermal shrinkage, there is no fear of occurrence of cracks in the transparent conductive layer 13 due to a size change.

As in the case of the transparent electroconductive film 15, the maximum thermal shrinkage ratio of the protective film 14 in the main surface is preferably equal to the absolute value of the maximum size change ratio of the protective film 14 in the main surface. When such a configuration is employed, there is no fear of occurrence of cracks in the transparent conductive layer 13 even when the protective film 14 is bonded to the transparent electroconductive film 15.

A difference between the maximum thermal shrinkage ratio of the transparent electroconductive film 15 (substantially the maximum thermal shrinkage ratio of the film substrate 11) and the maximum thermal shrinkage ratio of the protective film 14 is obtained by differentiating the formation conditions of these films. For example, even if the film substrate 11 and the protective film 14 are formed of the same polyethylene terephthalate (PET) and have the same thickness, their maximum thermal shrinkage ratios can be differentiated when their drawing conditions are mutually different.

A mechanism in which curl is developed in a conventional transparent electroconductive film with a protective film will be described, and subsequently a mechanism in which curl is reduced in a transparent electroconductive film with a protective film of the present invention will be described.

Figure 3:
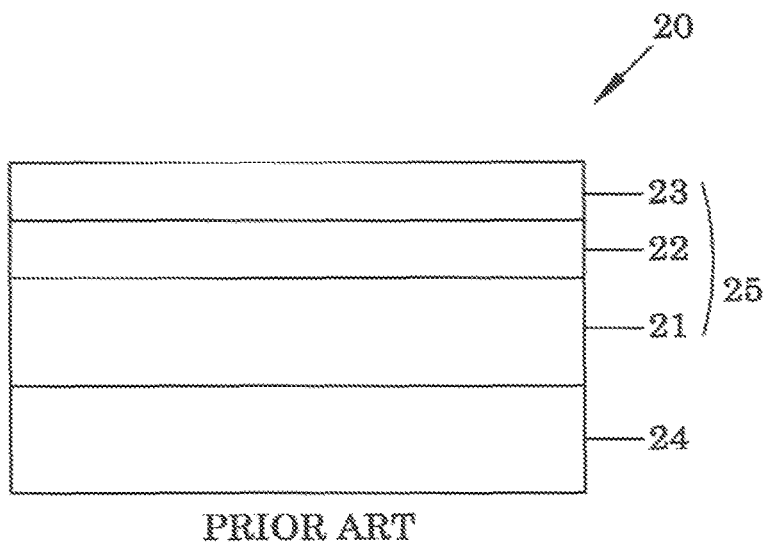
FIG. 3 is a schematic view of a first example of a conventional transparent electroconductive film with a protective film.

FIG. 3 is a schematic view of a first example of a conventional transparent electroconductive film 20 with a protective film. In the conventional transparent electroconductive film 20 with a protective film in FIG. 3, a wet optical adjustment layer 22 is formed on one main surface of a film substrate 21, and a transparent conductive layer 23 is formed on the wet optical adjustment layer 22. A laminate of the film substrate 21, the wet optical adjustment layer 22 and the transparent conductive layer 23 is referred to as a transparent electroconductive film 25. A protective film 24 is bonded to a main surface of the film substrate 21 on a side opposite to the transparent conductive layer 23. The wet optical adjustment layer 22 is an optical adjustment layer (e.g. a layer for adjusting the refractive index) which is formed by dissolving an organic resin material (e.g. acrylic resin) in a solvent (e.g. methyl isobutyl ketone), and applying the resulting solution to the film substrate 21 (wet process).

The first example of the conventional transparent electroconductive film 20 with a protective film is configured in such a manner that the thermal shrinkage ratio of the film substrate 21 is substantially equal to the thermal shrinkage ratio of the protective film 24. Since the thermal shrinkage ratios of the film substrate 21 and the protective film 24 are substantially equal to each other, curl is hardly developed in a sheet of the transparent electroconductive film 20 with a protective film by a temperature change.

In the first example of the conventional transparent electroconductive film 20 with a protective film, the moisture permeability of the wet optical adjustment layer 22 is very high. Accordingly, the difference between the absorption rate of water absorbed, in the film substrate 21 through the transparent conductive layer 23 and the wet optical adjustment layer 22 from air and the absorption rate of water absorbed in the protective film 24 directly from air is small. Both the film substrate 21 and the protective film 24 absorb water and expand, and since the difference between the water absorption rate of the film substrate 21 and the water absorption rate of the protective film 24 is small, the film substrate 21 and the protective film 24 absorb water and expand in the same way. Accordingly, curl in a sheet of the transparent electroconductive film 20 with a protective film, which is developed by water absorption and expansion, is small. Therefore, in the sheet, of the first example of the conventional transparent electroconductive film 20 with a protective film, either curl developed by a temperature change or curl developed by water absorption and expansion is small, and thus there is no problem with curl. However, the first example of the conventional transparent electroconductive film 20 with a protective film has a problem of poor scratch resistance.

Figure 4:
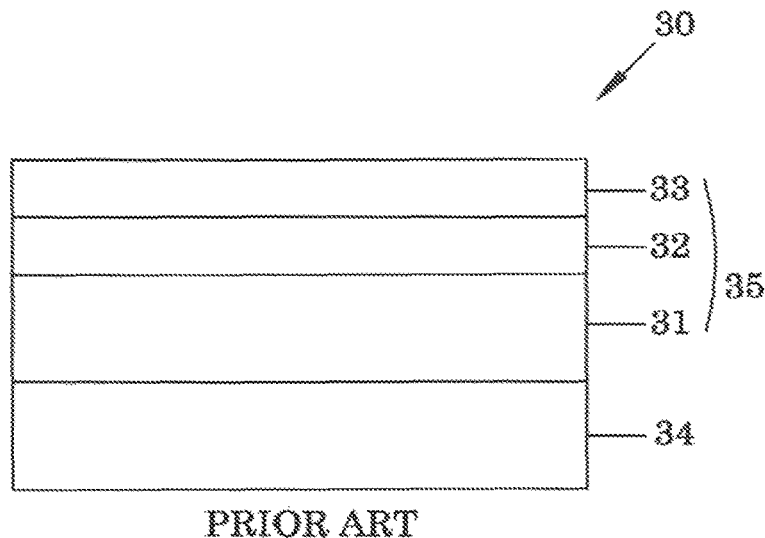
FIG. 4 is a schematic view of a second example of a conventional transparent electroconductive film with a protective film.

FIG. 4 is a schematic view of a second example of a conventional transparent electroconductive film 30 with a protective film. For solving the problem of poor scratch resistance in the first example of the conventional transparent electroconductive film 20 with a protective film, a dry optical adjustment layer 32 having high scratch resistance is used in the second example of a conventional transparent electroconductive film 30 with a protective film.

In the transparent electroconductive film 30 with a protective film in FIG. 4, a dry optical adjustment layer 32 is formed on one main surface of a film substrate 31, and a transparent conductive layer 33 is formed on the dry optical adjustment layer 32. A laminate of the film substrate 31, the dry optical adjustment layer 32 and the transparent conductive layer 33 is referred to as a transparent electroconductive film 35. A protective film 34 is bonded to a main surface of the film substrate 31 on a side opposite to the transparent conductive layer 33. The dry optical adjustment layer 32 is, for example, a silicon dioxide ($SiO_2$) layer formed by a sputtering method (dry process).

The second example of the conventional transparent electroconductive film 30 with a protective film is configured in such a manner that the thermal shrinkage ratio of the film substrate 31 is substantially equal to the thermal shrinkage ratio of the protective film 34. Since the thermal shrinkage ratios of the film substrate 31 and the protective film 34 are substantially equal to each other, curl is hardly developed in a sheet of the transparent electroconductive film 30 with a protective film by a temperature change.

The moisture permeability of the dry optical adjustment layer 32 is at least an order of magnitude smaller than the moisture permeability of the wet optical adjustment layer 22. For example, the moisture permeability of the wet optical adjustment layer 22 is about 20 g/m$^2$·day to 300 g/m$^2$·day, while the moisture permeability of the dry optical adjustment layer 32 is about 0.001 g/m$^2$·day to 1.0 g/m$^2$·day. In the second example of the conventional transparent electroconductive film 30 with a protective film, the moisture permeability of the dry optical adjustment layer 32 is at least an order of magnitude smaller than the moisture permeability of the wet optical adjustment layer 22. Therefore, the amount of water absorbed per unit time in the film substrate 31 through the transparent conductive layer 33 and the dry optical adjustment layer 32 from air is much smaller than the amount of water absorbed per unit time in the protective film 34 directly from air. The film substrate 31 also absorbs water in air through the protective film 34, and in this case, the time at which the film substrate 31 absorbs water is later than the time at which the protective film 34 absorbs water.

The amount of expansion generated by water absorption of the protective film 34 is larger than the amount expansion generated by water absorption of the film substrate 31. Therefore, as a result of expansion generated by water absorption, the size of the protective film 34 becomes larger than the size of the film substrate 31. Accordingly, in a sheet of the transparent electroconductive film 30 with a protective film, large curl is developed by expansion generated by water absorption. A sheet of the transparent electroconductive film 30 with a protective film, which has large curl, is extremely difficult to handle in a process for production of a large touch panel device, for example, a step of heating and crystallizing a transparent conductive layer and a step of bonding a transparent conductive layer to other materials.

[Curl Suppression Mechanism in the Present Invention]

Figure 2:
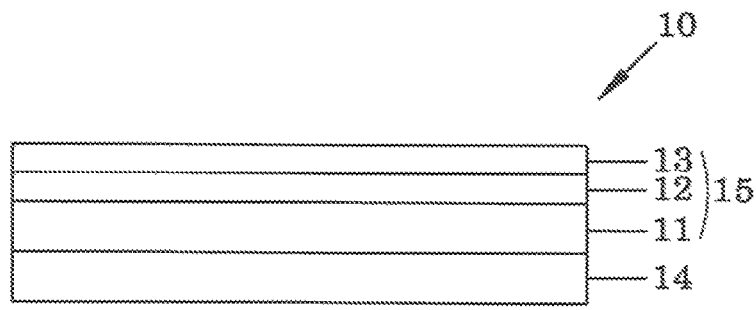
FIGS. 2(a) to 2(d) are each an explanatory view of a mechanism for suppressing curl in a transparent electroconductive film with a protective film.
Figure 2:
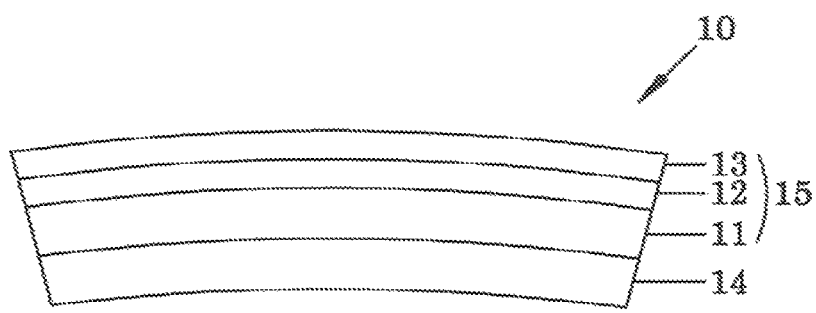
Figure 2:
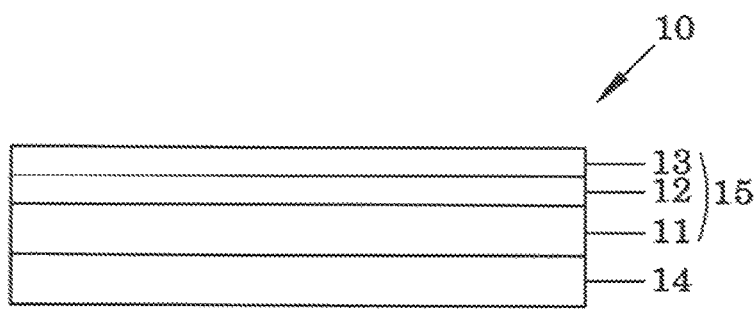
Figure 2:
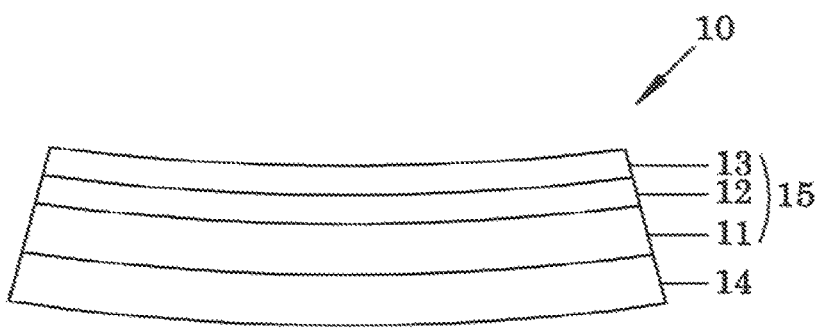

A mechanism for suppressing curl in a sheet of the transparent electroconductive film 10 with a protective film according to the present invention will be described with reference to FIGS. 2(*a*) to 2(*d*) (reference numerals in FIGS. 2 (*a*) to 2(*d*) are the same as those in FIG. 1). Referring to FIGS. 2(*a*) to 2(*d*), the mechanism is explained for a case where both the transparent electroconductive film 15 and the protective film 14 thermally shrink (have a positive thermal shrinkage ratio). FIG. 2(*a*) is a schematic view of a sheet of the transparent electroconductive film 10 with a protective film including the transparent electroconductive film 15 and the protective film 14 bonded to each other. The bonding is performed at normal temperature. At this point, a sheet of the transparent electroconductive film 10 with a protective film has almost no curl.

FIG. 2(*b*) is a schematic view when a sheet of the transparent electroconductive film 10 with a protective film is heated. The transparent electroconductive film 10 with a protective film often passes through a heating step in any of the steps in production of a touch panel device. For example, a touch panel device has routing wiring formed in a panel frame section, and for the wiring material, a silver paste is often used. The silver paste contains a large amount of a solvent, and is needed to be heated (at, for example, 140° C.) for solidifying the paste as wiring.

When the transparent conductive layer 13 is made of, for example, indium tin oxide (ITO), it is necessary to heat the transparent electroconductive film 10 with a protective film at, for example, 140° C. for crystallizing indium tin oxide to reduce the surface resistance value. Both the transparent electroconductive film 15 and the protective film 14 thermally shrink when heated, but they have mutually different thermal shrinkage ratios. Since the thermal shrinkage ratio of the transparent electroconductive film 15 is smaller than the thermal shrinkage ratio of the protective film 14, curl is developed in a direction shown in the drawing (the direction of the protective film 14).

FIG. 2(*c*) shows a change in curl when a sheet of the transparent electroconductive film 10 with a protective film after heating is left standing in air at normal temperature. In the transparent electroconductive film 10 with a protective film of the present invention, the moisture permeability of the optical adjustment layer 12 is very low. Accordingly, the absorption rate of water absorbed in the film substrate 11 through the transparent conductive layer 13 and the optical adjustment layer 12 from air is much lower than the absorption rate of water absorbed in the protective film 14 directly from air. The film substrate 11 also absorbs water in air through the protective film 14, and in this case, the time at which the film substrate 11 absorbs water is later than the time at which the protective film 14 absorbs water. As a result, both the film substrate 11 and the protective film 14 expand by water absorption, but since the water absorption rate of the protective film 14 is faster than the water absorption rate of the film substrate 11, the expansion of the protective film 14 generated by water absorption is larger than the expansion of the film substrate 11 generated by water absorption. Accordingly, curl in FIG. 2(*b*), which is developed by thermal shrinkage, is gradually corrected to produce an almost flat state with reduced curl as in FIG. 2(*c*).

When the difference in thermal shrinkage ratio between the transparent electroconductive film 15 and the protective film 14 and the difference in water absorption rate between the transparent electroconductive film 15 and the protective film 14 is well balanced, the state in FIG. 2(*c*) (state with reduced curl) can be obtained. When the difference in maximum thermal shrinkage ratio between the transparent electroconductive film 15 and the protective film 14 is excessively large (more than 0.6%), curl immediately after heating (before water absorption), which is developed by thermal shrinkage, becomes excessively large. Accordingly, curl cannot be sufficiently corrected by expansion generated by water absorption, and therefore the laminate remains in the state in FIG. 2(*b*) (state of being curled toward the protective film 14 side) even after expansion generated by water absorption. Conversely, when the difference in maximum thermal shrinkage ratio between the transparent electroconductive film 15 and the protective film 14 is excessively small (less than 0.05%), curl developed by thermal shrinkage is excessively corrected by expansion generated by water absorption, so that the laminate is largely curled in the state in FIG. 2(*d*) (state of being curled toward the transparent electroconductive film 15 side) after expansion generated by water absorption.

It has been found that when the moisture permeability of the optical adjustment layer 12 is 1.0 g/m$^2$·day or less, the absolute value of the maximum thermal shrinkage ratio (%) of the transparent electroconductive film 15 in the main surface is smaller than the absolute value of the maximum thermal shrinkage ratio (%) of the protective film 14 in the main surface, and the difference between the absolute values is 0.05% to 0.6%, the difference in thermal shrinkage ratio between the transparent electroconductive film 15 and the protective film 14 and the difference in water absorption rate between the transparent electroconductive film 15 and the protective film 14 are well balanced.

The optical adjustment layer 12 having a moisture permeability of 1.0 g/m²·day or less is preferably obtained from a sputtered layer.

It has been found that when the optical adjustment layer 12 includes a region having a carbon atom, content of 0.2 atomic % or less, the absolute value of the maximum, thermal shrinkage ratio (%) of the transparent electroconductive film 15 in the main surface is smaller than the absolute value of the maximum thermal shrinkage ratio (%) of the protective film 14 in the main surface, and the difference between the absolute values is 0.05% to 0.6%, the difference in thermal shrinkage ratio between the transparent electroconductive film 15 and the protective film 14 and the difference in water absorption rate between the transparent electroconductive film 15 and the protective film 14 are well balanced. The region having a carbon atom content of 0.2 atomic % or less is preferably obtained from a sputtered layer.

The shape of a sheet of the transparent electroconductive film with a protective film (a sheet cut out from the transparent electroconductive film with a protective film) in measurement of curl is preferably a square or a rectangle because it is easy to specify measurement points in curl, and the film is handled mostly in a square or rectangular shape in actual production steps, with a square being more preferable.

The area of a sheet of the transparent electroconductive film with a protective film is preferably 600 cm² or more, more preferably not less than 600 cm² and not more than 2,500 cm², further preferably not less than 620 cm² and not more than 2500 cm² most preferably not less than 1,200 cm² and not more than 2,500 cm². A sheet of the transparent electroconductive film with a protective film in measurement of curl is in the shape of, for example, an A4-size rectangle (624 cm²), a square which is 35 cm on each side (1,225 cm²), or a square which is 50 cm on each side (2,500 cm²). When the sheet area is less than 600 cm², presence/absence of curl at a level that causes a problem in the production steps is hard to be determined by conducting a curl test. When the sheet area is more than 2,500 cm², a sheet of the transparent electroconductive film with a protective film cannot be uniformly heated in some heating equipment, and thus values of curl may greatly vary.

In this specification, a sheet is cut out from the transparent electroconductive film with a protective film, and subjected to a heating treatment, and thereafter curl is measured with the transparent electroconductive film situated on the upper side when the sheet is curled toward the transparent electroconductive film side at the four corners of the sheet, or with the protective film situated on the upper side when the sheet is curled toward the protective film side at the four corners of the sheet. Curl at some of the four corners of a sheet of the transparent electroconductive film with a protective film may be in a direction opposite to the direction of curl at the other corners. In this case, first the measured value of curl at a corner at which the sheet is curled toward the transparent electroconductive film side is determined with the transparent electroconductive film situated on the upper side, and the measured value of curl at a corner which is curled toward the protective film side is determined with the sheet reversed to situate the protective film on the upper side.

The value of curl in the claims and specification of the present application means an average of measured values of curl which are determined at the positions of the four corners of a square or rectangular transparent electroconductive film with a protective film unless specified otherwise. The measured value of curl is a positive value when the corner of the sheet is curled toward the transparent electroconductive film side (FIG. 2(*d*)), and the measured value of curl is a negative value when the corner of the sheet is curled toward the protective film side (FIG. 2(*b*)).

The absolute value of curl when a sheet of a transparent electroconductive film with a protective film is heated at a temperature of 140° C. for 90 minutes, and subsequently exposed to an environment at a temperature of 25° C. and a relative humidity of 55% for 1 minute to 4 hours is desirably 2.1% or less of the maximum length of the sheet of the transparent electroconductive film with a protective film throughout the exposure time.

When a sheet of the transparent electroconductive film with a protective film is in the form of a square having a size of 50 cm×50 cm, the maximum length of the sheet is about 70.7 cm, i.e. the length of the diagonal line of the square. Therefore, the absolute value of curl is desirably 15 mm or less (2.1% or less of 70.7 cm) throughout the exposure time. When the absolute value of curl is more than 2.1% of the maximum length of a sheet of the transparent electroconductive film with a protective film, handling may be difficult in, for example, patterning and etching of the sheet of the transparent electroconductive film with a protective film. When a sheet of the transparent electroconductive film with a protective film is square or rectangular, the maximum length of the sheet is the length of the diagonal line. When a sheet of the transparent electroconductive film with a protective film is in an indeterminate shape, the maximum length of the sheet is the length of a part having the largest distance across.

The absolute value of curl when a sheet of a square or rectangular transparent electroconductive film with a protective film, which has a sheet area of not less than 600 cm² and not more than 2,500 cm², is heated at a temperature of 140° C. for 90 minutes, and subsequently exposed to an environment at a temperature of 25° C. and a relative humidity of 55% for 1 minute to 4 hours is preferably 15 mm or less throughout the exposure time. When the absolute value of curl is 15 mm or less, a process failure resulting from curl does not occur even in a process for production of a large touch panel device.

For the direction of curl, for example, the sheet is desirably curled toward the protective film side (the value of curl is negative) as shown in FIG. 2(*b*). This is because in patterning and etching of a sheet of the transparent electroconductive film 10 with a protective film by photolithography, the protective film side of the sheet of the transparent electroconductive film with a protective film can be conveniently suctioned to a vacuum adsorption stage.

The transparent electroconductive film with a protective film of this embodiment has been described above, but the present invention is not limited to the embodiment described above, and various modifications and changes can be made based on the technical concept of the present invention.

EXAMPLES AND COMPARATIVE EXAMPLES

Examples 1 to 4 of transparent electroconductive films with a protective film of the present invention, and Comparative Examples 1 to 4 are shown in Table 1. Each sample is a square sheet having a size of 50 cm×50 cm (sheet area: 2,500 cm²).

TABLE 1

| | Moisture permeability g/m² · day | Maximum thermal shrinkage ratio (%) | | | Curl (mm) | | | | Scratch resistance |
|---|---|---|---|---|---|---|---|---|---|
| | | Transparent electroconductive film | Protective film | Difference | Immediately after heating | After 30 minutes | After 1 hour | After 4 hours | |
| Example 1 | 0.2 | 0.30 | 0.45 | 0.15 | −5 | −3 | −2 | −1 | ○ |
| Example 2 | 0.2 | 0.20 | 0.51 | 0.31 | −9 | −7 | −6 | −4 | ○ |
| Example 3 | 0.2 | 0.22 | 0.46 | 0.24 | −6 | −4 | −3 | −2 | ○ |
| Example 4 | 0.6 | 0.22 | 0.46 | 0.24 | −7 | −5 | −4 | −2 | ○ |
| Comparative Example 1 | 0.2 | 0.43 | 0.45 | 0.02 | 7 | 14 | 16 | 17 | ○ |
| Comparative Example 2 | 0.2 | 0.51 | 0.48 | −0.03 | 9 | 15 | 18 | 19 | ○ |
| Comparative Example 3 | 25 or more | 0.46 | 0.45 | −0.01 | 7 | 7 | 7 | 8 | x |
| Comparative Example 4 | 6 or more | 0.30 | 0.45 | 0.15 | −5 | −4 | −4 | −4 | x |

Example 1

Figure 5:
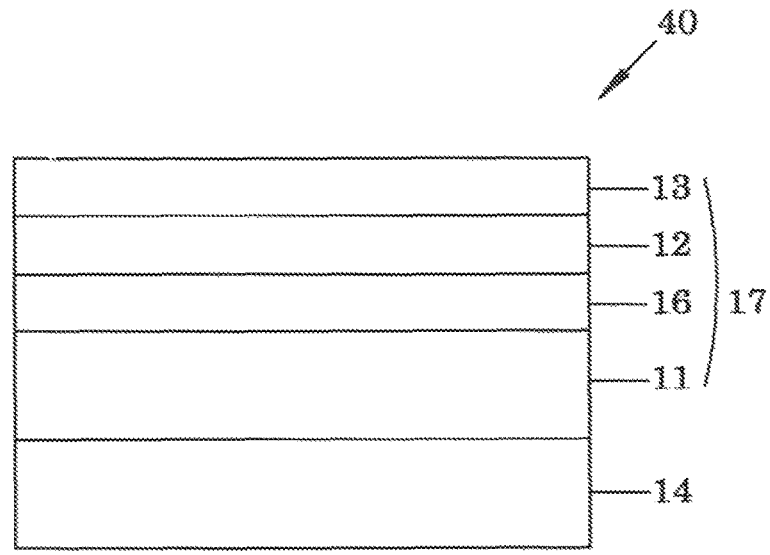
FIG. 5 is a schematic view of a transparent electroconductive film with a protective film in an example of the present invention.

A film configuration of a transparent electroconductive film 40 with a protective film in Example 1 is shown in FIG. 5 (the same parts as in FIG. 1 are given the same reference numerals). A hard coat layer 16 is formed on one main surface of a film substrate 11, an optical adjustment layer 12 is formed on the hard coat layer 16, and a transparent conductive layer 13 is formed on the optical adjustment layer 12. A laminate of the film substrate 11, the hard coat layer 16, the optical adjustment layer 12 and the transparent conductive layer 13 is referred to as a transparent electroconductive film 17. A protective film 14 is bonded to a main surface of the film substrate 11 on a side opposite to the transparent conductive layer 13. The film substrate 11 is a 100 μm-thick polyethylene terephthalate (PET) film, and the protective film 14 is a 120 μm-thick polyethylene terephthalate (PET) film. The hard coat layer 16 is a 0.3 μm-thick layer containing zirconium oxide particles and an ultraviolet ray-curable resin including an acrylic resin. The maximum thermal shrinkage ratio of the transparent electroconductive film 17 is substantially the maximum thermal shrinkage ratio of the film substrate 11. The drawing conditions of the film substrate 11 and the protective film 14 are mutually different. The drawing conditions were adjusted so that the maximum thermal shrinkage ratio of the transparent electroconductive film 17 was 0.30%, and the maximum thermal shrinkage ratio of the protective film 14 was 0.45%.

The optical adjustment layer 12 is a silicon oxide layer with a total thickness of 20 nm, which includes a 3 nm-thick SiOx (x=1.5) layer and a 17 nm-thick SiO₂ layer formed on the SiOx layer. The SiOx layer was formed on the hard coat layer 16 by sputtering a Si target in a vacuum atmosphere at 0.3 Pa where argon and oxygen (argon:oxygen=100:1) existed. The SiO₂ layer was formed on the SiOx layer by sputtering a Si target in a vacuum atmosphere at 0.2 Pa where argon and oxygen (argon:oxygen=100:38) existed.

The transparent conductive layer 13 is a 22 nm-thick indium tin oxide (ITO) layer formed by sputtering a target containing indium oxide and tin oxide at a weight ratio of 90:10 in a vacuum atmosphere at 0.4 Pa where argon and oxygen (argon:oxygen=100:1) existed. The resistivity of the crystalline layer after heating the transparent conductive layer 13 at 140° C. for 90 minutes was 3.3×10⁻⁴ Ω·cm. The optical adjustment layer 12 and the transparent conductive layer 13 were formed while a surface of the film substrate 11 on a side opposite to a surface on which the optical adjustment layer 12 was formed was brought into contact with a film formation roll at 0° C. to cool the film substrate 11.

Example 2

A transparent electroconductive film with a protective film in Example 2 was prepared in the same manner as in Example 1 except that the maximum thermal shrinkage ratio of the transparent electroconductive film was 0.20%, and the maximum thermal shrinkage ratio of the protective film was 0.51%.

Example 3

A transparent electroconductive film with a protective film in Example 3 was prepared in the same manner as in Example 1 except that the maximum thermal shrinkage ratio of the transparent electroconductive film was 0.22%, and the maximum thermal shrinkage ratio of the protective film was 0.46%.

Example 4

A transparent electroconductive film with a protective film in Example 4 was prepared in the same manner as in Example 3 except that the atmospheric pressure in formation of a SiO₂ layer which formed the optical adjustment layer 12 was 0.3 Pa. The density and moisture permeability of the SiO₂ layer can be adjusted by changing the atmospheric pressure in formation of the SiO₂ layer.

Comparative Example 1

A transparent electroconductive film with a protective film in Comparative Example 1 was prepared in the same manner as in Example 1 except that the maximum thermal shrinkage ratio of the transparent electroconductive film was 0.43%, and the maximum thermal shrinkage ratio of the protective film was 0.45%.

Comparative Example 2

A transparent electroconductive film with a protective film in Comparative Example 2 was prepared in the same manner as in Example 1 except that the maximum thermal shrinkage ratio of the transparent electroconductive film was 0.51%, and the maximum thermal shrinkage ratio of the protective film was 0.48%.

Comparative Example 3

Figure 6:
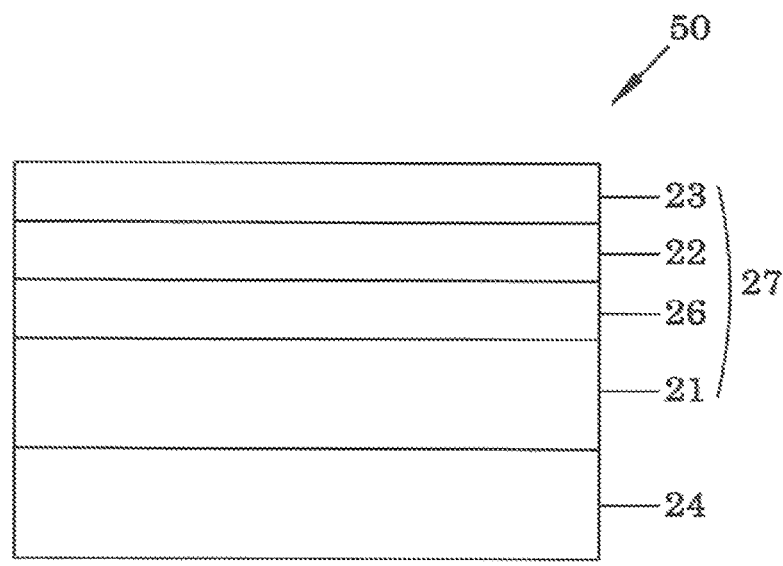
FIG. 6 is a schematic view of a transparent electroconductive film with a protective film in Comparative Example 3.

A film configuration of a transparent electroconductive film 50 with a protective film in Comparative Example 3 is shown in FIG. 6 (the same parts as in FIG. 3 are given the same reference numerals). A hard coat layer 26 is formed on one main surface of a film substrate 21, a wet optical adjustment layer 22 is formed on the hard coat layer 26, and a transparent conductive layer 23 is formed on the wet optical adjustment layer 22. A protective film 24 is bonded to a main surface of the film substrate 21 on a side opposite to the transparent conductive layer 23. The film substrate 21 is a 100 μm-thick polyethylene terephthalate film, and the protective film 24 is a 120 μm-thick polyethylene terephthalate film. The maximum thermal shrinkage ratio of the transparent electroconductive film 27 (substantially the maximum thermal shrinkage ratio of the film substrate 21) is 0.46%, and the maximum thermal shrinkage ratio of the protective film 24 is 0.45%. Thus, these films have substantially the same maximum thermal shrinkage ratio. The wet optical adjustment layer 22 was formed in the following manner: a thermosetting resin including a melamine resin, an alkyd resin and an organic silane condensate at a weight ratio of 2:2:1 was applied to the hard coat layer 26 in a thickness of 35 nm. The hard coat layer 26 and the transparent conductive layer 23 were prepared in the same manner as in Example 1. The resistivity of the crystalline layer after heating the transparent conductive layer 23 at 140° C. for 90 minutes was $3.2 \times 10^{-4}$ Ω·cm.

Comparative Example 4

A transparent electroconductive film with a protective film in Comparative Example 4 was prepared in the same manner as in Example 1 except that an 8 nm-thick $SiO_2$ layer was formed as a dry optical adjustment layer using an electron beam vapor deposition method.

[Moisture Permeability]

The moisture permeability in each of Examples 1 to 4 and Comparative Examples 1, 2 and 4 shown in Table 1 is a moisture permeability at a temperature of 40° C. and a relative humidity of 90% for a film with a dry optical adjustment layer, which is obtained by removing only the transparent conductive layer by etching in the transparent electroconductive film (not provided with a protective film). The moisture permeability in Comparative Example 3 as shown in Table 1 is a moisture permeability at a temperature of 40° C. and a relative humidity of 90% for a thin PET film with a wet optical adjustment layer, which is prepared by forming a 0.3 μm-thick hard coat layer and a 35 nm-thick thermosetting resin on a thin PET film (thickness: 23 μm) with a higher moisture permeability using the same materials and coating conditions as in Comparative Example 3.

The reason why the moisture permeability is low in Examples 1 to 4 and Comparative Examples 1 and 2 is that the dry optical adjustment layers formed by sputtering under the formation conditions in Examples 1 to 4 and Comparative Examples 1 and 2 have a low moisture permeability. The reason why the moisture permeability is remarkably high in Comparative Example 3 is that the wet optical adjustment layer (35 nm-thick thermosetting resin layer formed by a coating method) has a remarkably high moisture permeability. The reason why the moisture permeability is high in Comparative Example 4 is that the dry optical adjustment layer formed by an electron beam vapor deposition method has a high moisture permeability.

[Maximum Thermal Shrinkage Ratio]

The maximum thermal shrinkage ratio shown in Table 1 is a maximum thermal shrinkage ratio (%) in the main surface of each of the transparent electroconductive film and the protective film when they are heated at 140° C. for 90 minutes. In Examples 1 to 4 and Comparative Examples 1 to 4, the value of the maximum thermal shrinkage ratio of each of the transparent electroconductive film and the protective film is positive (because the film is thermally shrunk), and therefore the value in Table 1 is equal to the absolute value of the maximum thermal shrinkage ratio in each example. In the present invention, the magnitude relation and the magnitude of a difference between the maximum thermal shrinkage ratio (absolute value) of the transparent electroconductive film and the maximum thermal shrinkage ratio (absolute value) of the protective film are important. It is necessary that the absolute value of the maximum thermal shrinkage ratio of the transparent electroconductive film be smaller than the absolute value of the maximum thermal shrinkage ratio of the protective film, and the difference between the absolute values be 0.05% to 0.6%. Examples 1 to 4 satisfy this requirement.

[Curl]

The values of curl shown in Table 1 are determined in the following manner: a sheet of the transparent electroconductive film with a protective film is heated at 140° C. for 90 minutes in a heat treatment furnace, and measurement is performed immediately after the sheet is taken out from the heat treatment furnace, after the sheet is left standing in an atmosphere at room temperature (at a temperature of 25° C. and a relative humidity of 55%) for 30 minutes, after the sheet is left standing at room temperature for 1 hour, and after the sheet is left standing at room temperature for 4 hours. In Examples 1 to 4 and Comparative Example 4, the value of curl is negative. In Comparative Examples 1 to 3, the value of curl is positive. Immediately after the sheet is taken out from the heat treatment furnace, either the transparent electroconductive film or the protective film has not absorbed water in air yet.

In Examples 1 to 4, the value of curl is negative at every measurement time, and the absolute value of curl is the largest immediately after heating (immediately after the sheet is taken out from the heat treatment furnace), and decreases with elapse of time. In all of Examples 1 to 4, the magnitude of the absolute value of curl is 15 mm or less (2.1% or less of the maximum length (diagonal line length) of the sample) throughout the exposure time, i.e. a period of time until elapse of 4 hours immediately after heating. Comparison among Examples 1 to 4 shows that the absolute value of curl tends to be large at every measurement time when there is a large difference in maximum thermal shrinkage ratio between the transparent electroconductive film and the protective film. However, in any of Examples 1 to 4, curl is not so large that there is a problem in practical use.

In Comparative Examples 1 and 2, the value of curl is positive at every measurement time, and the absolute value of curl is the smallest immediately after heating, and increases with elapse of time. In Comparative Example 1, the transparent electroconductive film has a maximum thermal shrinkage ratio smaller than that of the protective film, but the difference between the absolute values is excessively small (less than 0.05%), and therefore water absorption and expansion of the protective film cannot be canceled by the difference in maximum thermal shrinkage ratio. Accordingly, curl tends to increase with elapse of time. In Comparative Examples 1 and 2, the value of curl is 15 mm or less immediately after heating, but exceeds 15 mm (2.1% of the maximum length (diagonal line length) of the sample) after 1 hour and 4 hours.

In Comparative Example 2, the transparent electroconductive film has a maximum thermal shrinkage ratio larger than that of the protective film, and therefore expansion generated by water absorption of the protective film is further increased by the difference in maximum thermal shrinkage ratio. Accordingly, curl tends to increase with elapse of time. The size of curl in Comparative Example 2 is larger than that in Comparative Example 1 as a matter of course.

Comparative Example 3, which is a reference example because a wet optical adjustment layer is used, is configured in such a manner that there is almost no difference in maximum thermal shrinkage ratio between the transparent electroconductive film and the protective film. Since a wet optical adjustment layer having a remarkably higher moisture permeability as compared to a dry optical adjustment layer is used, the difference in expansion generated by water absorption between the transparent electroconductive film and the protective film is small. As a result, the size of curl is small, and hardly changes even when expansion generated by water absorption proceeds with elapse of time.

In Comparative Example 4, the value of curl is negative at every measurement time, and the absolute value of curl hardly changes with elapse of time. The dry optical adjustment layer in Comparative Example 4 has a remarkably higher moisture permeability as compared to the dry optical adjustment layers in Examples 1 to 4 and Comparative Examples 1 and 2. Accordingly, as in the case of Comparative Example 3, the difference in expansion generated by water absorption between the transparent electroconductive film and the protective film is small. As a result, a change in curl is small even when expansion generated by water absorption proceeds with elapse of time.

The transparent electroconductive film with a protective film in each of Example 1 and Comparative Example 1 was cut into a size of 10 cm×10 cm, and curl was evaluated in the same manner as in Examples 1 to 4 and Comparative Examples 1 to 4. The results showed that the absolute value of curl in Example 1 was the largest (value of curl: −4 mm) immediately after heating, and the absolute value of curl in Comparative Example 1 was the largest (value of curl: 8 mm) after 4 hours (these results are not shown in Table 1). Thus, in both the example and the comparative example, the absolute value of curl was low (not more than 15 mm).

This means that in conventional curl measurement in a small area, it is difficult to detect curl that causes a problem when the transparent electroconductive film with a protective film according to the embodiment of the present invention is used in a large area. A technical design of a transparent electroconductive film with a protective film, which has a small absolute value of curl in a large area and is excellent in scratch resistance, would be impossible within the conventional common technical knowledge.

[Scratch Resistance]

In Examples 1 to 4 and Comparative Examples 1 and 2, the transparent electroconductive film with a protective film included a dry optical adjustment layer (a 20 nm-thick silicon oxide layer formed by a sputtering method) having a sufficiently low moisture permeability and a high layer density, so that a change in resistance value was small (R20/R0=1.1 or less) after a scratch resistance test was conducted, and thus the scratch resistance was satisfactory.

In Comparative Example 3, the transparent electroconductive film with a protective film included an optical adjustment layer (a 35 nm-thick thermosetting resin layer formed by a coating method) having a high moisture permeability and a low layer density, so that the resistance value greatly changed (R20/R0=1.9) after a scratch resistance test, and thus the scratch resistance was insufficient.

In Comparative Example 4, the transparent electroconductive film with a protective film included a dry optical adjustment layer having a high moisture permeability and a low layer density, so that the resistance value greatly changed (R20/R0=1.8) after a scratch resistance test, and thus the scratch resistance was insufficient.

[Presence/Absence of Region Where Impurity Atoms (Carbon Atoms) Exist in Optical Adjustment Layer]

It was confirmed by X-ray photoelectron spectroscopy that the optical adjustment layer 12 (a 20 nm-thick silicon oxide layer formed by a sputtering method) in Examples 1 to 4 and Comparative Examples 1 and 2 had at least 50% of a region having a carbon atom content of 0.2 atomic % or less in the thickness direction. It was confirmed by X-ray photoelectron spectroscopy that the wet optical adjustment layer 22 (a 35 nm-thick thermosetting resin layer formed by a coating method) in Comparative Example 3 and the optical adjustment layer 12 (an 8 nm-thick $SiO_2$ layer formed by an electron beam vapor deposition method) in Comparative Example 4 did not have a region having a carbon atom content of 0.2 atomic % or less.

[Measurement Method]

[Maximum Thermal Shrinkage Ratio]

First, the transparent electroconductive film with a protective film was separated into a transparent electroconductive film and a protective film (with a pressure sensitive adhesive layer). Next, from each of the transparent electroconductive film and the protective film, a sample was taken in a square of 10 cm (L1) in the machine direction (MD) and 10 cm in a direction orthogonal thereto (transverse direction (TD)), and the sample was heated at 140° C. for 90 minutes. The length (L2) of the sample in the maximum thermal shrinkage direction (MD in Examples 1 to 4 and Comparative Examples 1 to 4) after heating was measured, and the maximum thermal shrinkage ratio was calculated in accordance with the equation of "maximum thermal shrinkage ratio (%)={(L1−L2)/L1}×100."

[Curl]

In measurement of curl, a square sheet (50 cm×50 cm) cut out from the transparent electroconductive film with a protective film was heated at 140° C. for 90 minutes, and then placed on a surface plate. Heights at the four corners of the square (measured values of curl) were measured, and an average of the measured values was calculated, and defined as a value of curl.

[Moisture Permeability of Optical Adjustment Layer]

In Examples 1 to 4 and Comparative Examples 1, 2 and 4, the amorphous transparent conductive layer (transparent conductive layer before the heating treatment) of the transparent electroconductive film (not provided with a protective film) was immersed in hydrochloric acid (concentration: 10% by weight) at 20° C. for 2 minutes to be etched off, thereby obtaining a film substrate with an optical adjustment layer (including a hard coat layer). Thereafter, the moisture permeability of the film substrate with an optical adjustment layer was measured by a so-called MOCON method, and the measured value was defined as a moisture permeability of the optical adjustment layer. Specifically, the moisture permeability was measured in an atmosphere at a temperature of 40° C. and a relative humidity of 90% in accordance with JIS K7129:2008 using a test device "PERMATRAN W3/33 (manufactured by MOCON Inc.)."

In Comparative Example 3, the moisture permeability of the wet optical adjustment layer is higher than the moisture permeability of the 100 μm-thick polyethylene terephthalate film (PET) substrate (moisture permeability: 6 g/m²·day). Therefore, when the moisture permeability of the film with a wet optical adjustment layer is evaluated, a value of the moisture permeability of the polyethylene terephthalate film substrate is obtained as the value of the moisture permeability of the film with a wet optical adjustment layer, and thus the moisture permeability of the wet optical adjustment layer cannot be measured.

In this specification, a thin polyethylene terephthalate film (thickness: 23 μm, moisture permeability: 25 g/m²·day) having a moisture permeability higher than that of the 100 μm-thick polyethylene terephthalate substrate was provided in order to determine the level of the moisture permeability of the wet optical adjustment layer for the silicon oxide layer and the film substrate in this example. A 0.3 μm-thick hard coat layer and a 35 nm-thick wet optical adjustment layer were formed on the thin polyethylene terephthalate film with materials and coating conditions identical to those in Comparative Example 3 to obtain a thin PET film with a wet optical adjustment layer, and the moisture permeability was evaluated in the same manner as in Examples 1 to 3 and Comparative Examples 1 and 2.

The result showed that the moisture permeability of the thin PET film with a wet optical adjustment layer was 25 g/m²·day, and the moisture permeability of the wet optical adjustment layer was higher than the moisture permeability of the thin polyethylene terephthalate film. Thus, although the accurate moisture permeability of the wet optical adjustment layer was not measured, the value thereof was shown to be 25 g/m²·day or more, and therefore the moisture permeability of the wet optical adjustment layer was determined to be 25 g/m²·day or more.

In Comparative Example 4, the moisture permeability of the dry optical adjustment layer was equivalent to the moisture permeability (6 g/m²·day) of the film substrate 11 (100 μm-thick PET substrate) as in the case of Comparative Example 3, and it was thus impossible to accurately measure the moisture permeability. Accordingly, the moisture permeability of the dry optical adjustment layer in Comparative Example 4 was determined to be 6 g/m²·day or more.

As a reference, the same $SiO_2$ film as that of the dry optical adjustment layer in Comparative Example 4 except that the thickness was 30 nm was deposited on the film substrate 11 (100 μm-thick PET substrate) to prepare a PET substrate with a vacuum-deposited film, and the moisture permeability was measured. The result showed that the moisture permeability of the dry optical adjustment layer was equivalent to the moisture permeability (moisture permeability: 6 g/m²·day) of the 100 μm-thick PET substrate even when the dry optical adjustment layer had a thickness of 30 nm, which is a thickness 1.5 times as large as the thickness of the optical adjustment layer in Examples 1 to 4. This shows that the dry optical adjustment layer in Comparative Example 4 has a moisture permeability that is apparently larger than that of the dry optical adjustment layer composed of a sputtered layer as in Examples 1 to 4 and Comparative Examples 1 and 2.

The result of evaluating the moisture permeability of the transparent electroconductive film (not provided with a protective film) in Comparative Example 3 with the transparent conductive layer crystallized by performing heating at 140° C. for 90 minutes showed that the moisture permeability was 1.2 g/m²·day. This value is substantially the moisture permeability of the transparent conductive layer because the moisture permeability of the 100 μm-thick PET substrate is 6 g/m²·day, and the moisture permeability of the wet optical adjustment layer in Comparative Example 3 is 25 g/m²·day or more.

Comparison of the moisture permeability of the dry optical adjustment layer with the moisture permeability of the transparent conductive layer and the moisture permeability of the film substrate 11 in Examples 1 to 4 and Comparative Examples 1 and 2 shows that the moisture permeability of the dry optical adjustment layer in Examples 1 to 4 and Comparative Examples 1 and 2 is the lowest in the layers that form the transparent electroconductive film 15.

[Evaluation of Region Where Impurity Atoms (Carbon Atoms) Exist in Optical Adjustment Layer]

Evaluation of a region where impurity atoms (carbon atoms) existed in the thickness direction in the optical adjustment layer was performed by X-ray photoelectron spectroscopy (commonly called ESCA) using a measuring apparatus Quantum 2000 (ULVAC-PHI, INCORPORATED.) Specifically, depth profile measurement for In, Si, O and C atoms was performed while the transparent electroconductive film with a protective film was etched with Ar ions in a direction from the transparent conductive layer side to the film substrate, and the element ratios (atomic %) of the four elements were calculated per nanometer in terms of $SiO_2$. The ratio of the region where impurity atoms (carbon atoms) existed in the thickness direction in the optical adjustment layer was determined from the formula: $(T_2/T_1) \times 100$ (%) where $T_1$ is a thickness of the $SiO_2$ layer measured in the depth profile and $T_2$ is a thickness of the region where carbon atoms were detected. Based on the obtained value, a ratio of a region having a carbon atom content of 0.2 atomic % or less was calculated from the formula: "$100-(T_2/T_1) \times 100$" (%).

Figure 7:
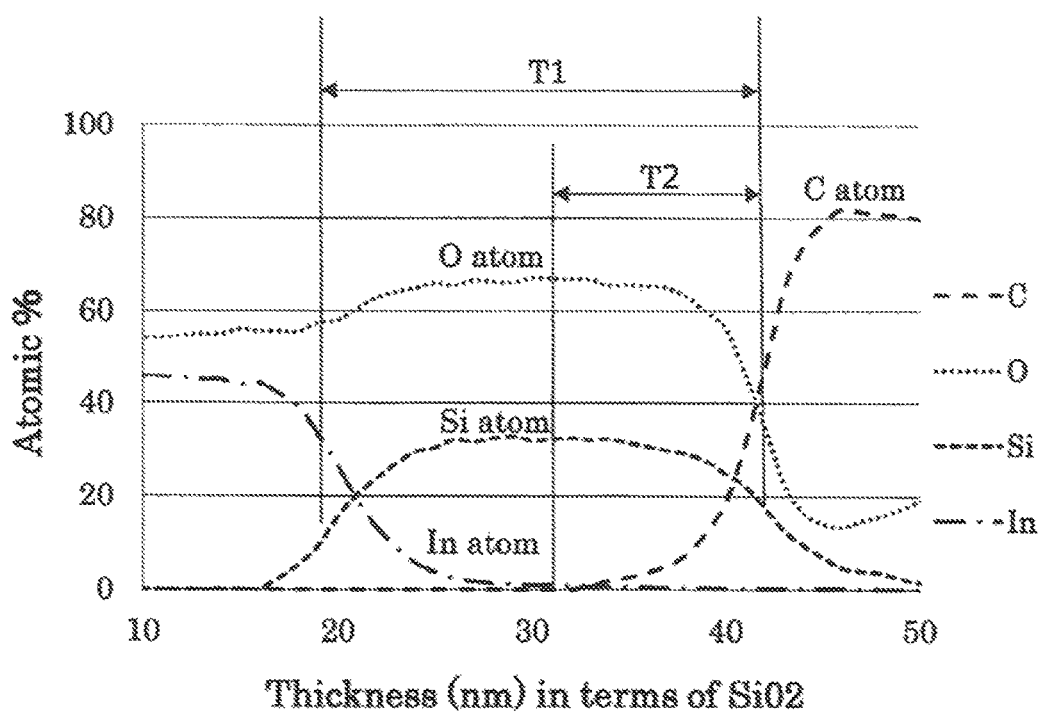
FIG. 7 shows a depth profile for In, Si, O and C atoms as measured by an ESCA method.

A method for determining the thickness $T_1$ of the $SiO_2$ layer will be described below. FIG. 7 shows a depth profile of the above-mentioned four elements as measured per nanometer in terms of $SiO_2$. The horizontal axis represents the thickness direction (nm), and the vertical axis represents the element ratio (atomic %). In FIG. 7, the left end corresponds to the transparent conductive layer side (surface side), and the right end corresponds to the hard coat layer side. Due to the analytic characteristic of ESCA, the depth profile is in the form of drawing a skirt. For the thickness $T_1$ of $SiO_2$, the positions at which the element ratio of Si decreased by half with respect to the maximum value of the element ratio of Si on the surface side and on the film substrate side were defined as the outermost part and the deepest part, respectively, of the $SiO_2$ layer, and the thickness between the outermost part and the deepest part was determined as the thickness $T_1$ of the $SiO_2$ layer.

In the thickness $T_1$ thus determined, the thickness $T_2$ of a region where C atoms were detected as impurity atoms was calculated, and the ratio of the region where impurity atoms existed was determined (($T_2/T_1) \times 100$ (%)).

[Scratch Resistance]

The transparent electroconductive film with a protective film, which was heated at 140° C. for 90 minutes, was cut in the form of a rectangle of 5 cm×11 cm. A silver paste was applied to both end parts of 5 mm on the long edge side, and naturally dried for 48 hours. Next, from the transparent electroconductive film with a protective film, the protective film was separated, and a surface of the transparent electroconductive film on a side opposite to the transparent conductive layer was attached to a glass plate with a pressure sensitive adhesive to obtain a sample for evaluation of scratch resistance. At a central position (a position of 2.5 cm) on the short edge side of the sample for evaluation of scratch resistance, the surface of the transparent conductive layer in the sample for evaluation of scratch resistance was rubbed over a length of 10 cm in the long side direction under the following conditions using a decuplet-type pen testing machine (manufactured by MTM Company). The resistance value (R0) of the sample for evaluation of scratch resistance before it was rubbed, and the resistance value (R20) of the sample for evaluation of scratch resistance after it was rubbed were measured by putting a tester on the silver paste part on both end parts at a central position (a position of 5.5 cm) on the long edge side of the sample for evaluation of scratch resistance, and the resistance change ratio (R20/R0) was determined to evaluate scratch resistance. A sample having a resistance change ratio of 1.5 or less was rated "O," and a sample having a resistance change ratio of more than 1.5 was rated "x."

Scratcher: ANTICON GOLD (manufactured by CONTEC CO., LTD.)
Load: 127 g/cm$^2$
Scratch rate: 13 cm/second (7.8 m/minute)
Scratch number: 20 (10 rounds)

[Thickness of Each Component]

The thickness of each of the film substrate and the protective film was measured using a thickness meter (manufactured by OZAKI MFG. CO., LTD. (Peacock (registered trademark)); apparatus name "Digital Dial Gauge DG-205"). The thickness of each of the hard coat layer, the optical adjustment layer and the transparent conductive layer was measured by observing a cross-section using a transmission electron microscope (manufactured by Hitachi, Ltd.; apparatus name "H-7650").

INDUSTRIAL APPLICABILITY

While uses of the transparent electroconductive film with a protective film of the present invention are not limited, the transparent electroconductive film with a protective film of the present invention is particularly suitably used in a touch panel.

What is claimed is:

1. A transparent electroconductive film with a protective film, comprising:
   a transparent electroconductive film including a laminate, which includes a film substrate, and at least an optical adjustment layer and a transparent conductive layer in this order on one main surface of the film substrate; and
   a protective film bonded to a main surface of the film substrate on a side opposite to the transparent conductive layer,
   wherein:
   the optical adjustment layer includes a sputtered layer,
   the transparent electroconductive film and the protective film are thermally shrinkable in at least one direction in a main surface,
   an absolute value of a maximum thermal shrinkage ratio (%) of the transparent electroconductive film in a main surface is smaller than an absolute value of a maximum thermal shrinkage ratio (%) of the protective film in a main surface, and the difference between the absolute values is 0.05% to 0.6%,
   an interlayer adhesive strength between the protective film and the film substrate is 3N/50 mm or less, and
   an absolute value of curl developed when the transparent electroconductive film with a protective film is cut into a square or ectangular sheet with an area of 600 cm$^2$ or more, the sheet is heated at a temperature of 140° C. for 90 minutes, and subsequently exposed to an environment at a temperature of 25° C. and a relative humidity of 55% for 1 minute to 4 hours is 15 mm or less throughout exposure time.

2. The transparent electroconductive film with a protective film according to claim 1, wherein an absolute value of curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1minute to 4 hours is 2.1% or less of a diagonal length of the sheet throughout exposure time.

3. The transparent electroconductive film with a protective film according to claim 1, wherein an interlayer adhesive strength between the protective film and the film substrate is smaller than an interlayer adhesive strength between any other pair of adjacent layers.

4. The transparent electroconductive film with a protective film according to claim 1, wherein a moisture permeability of the transparent electroconductive film at a temperature of 40° C. and a relative humidity of 90% is 1.0 g/m$^2$·day or less.

5. The transparent electroconductive film with a protective film according to claim 1, wherein a measured value of curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is a negative value as an average of measured values of curl at four corners of the sheet, throughout the exposure time, where the measured value of curl toward a transparent electroconductive film side is a positive value and the measured value of curl toward a protective film side is a negative value.

6. The transparent electroconductive film with a protective film according to claim 1, wherein curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is in a direction toward a protective film side at four corners of the sheet throughout the exposure time.

7. The transparent electroconductive film with a protective film according to claim 1, wherein the film substrate and the protective film are each formed of polyethylene terephthalate, and in each of the film substrate and the protective film, a thermal shrinkage ratio in a MD (machine direction) is a maximum thermal shrinkage ratio.

8. A transparent electroconductive film with a protective film, comprising:
   a transparent electroconductive film including a laminate, which includes a film substrate, and at least an optical adjustment layer and a transparent conductive layer in this order on one main surface of the film substrate; and
   a protective film bonded to a main surface of the film substrate on a side opposite to the transparent conductive layer,
   wherein:
   the optical adjustment layer includes a region having a carbon atom content of 0.2atomic % or less in a thickness direction, the transparent electroconductive film and the protective film are thermally shrinkable in at least one direction in a main surface, an absolute value of a maximum thermal shrinkage ratio (%) of the transparent electroconductive film in a main surface is smaller than an absolute value of a maximum thermal shrinkage ratio (%) of the protective film in a main surface, and the difference between the absolute values is 0.05% to 0.6%, an interlayer adhesive strength between the protective film and the film substrate is 3N/50 mm or less, and an absolute value of curl developed when the transparent electroconductive film with a protective film is cut into a square or rectangular sheet with an area of 600 cm$^2$ or more, the sheet is heated at a temperature of 140° C. for 90 minutes, and subsequently exposed to an environment at a temperature of 25° C. and a relative humidity of 55% for 1 minute to 4 hours is 15 mm or less throughout exposure time.

9. The transparent electroconductive film with a protective film according to claim 8, wherein an absolute value of curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is 2.1% or less of a diagonal length of the sheet throughout exposure time.

10. The transparent electroconductive film with a protective film according to claim 8, wherein an interlayer adhesive strength between the protective film and the film substrate is smaller than an interlayer adhesive strength between any other pair of adjacent layers.

11. The transparent electroconductive film with a protective film according claim 8, wherein a moisture permeability of the transparent electroconductive film at a temperature of 40° C. and a relative humidity of 90% is 1.0 g/m$^2$ ·day or less.

12. The transparent electroconductive film with a protective film according to claim 8, wherein a measured value of curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is a negative value as an average of measured values of curl at four corners of the sheet, throughout the exposure time, where the measured value of curl toward a transparent electroconductive film side is a positive value and the measured value of curl toward a protective film side is a negative value.

13. The transparent electroconductive film with a protective film according to claim 8, wherein curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is in a direction toward a protective film side at four corners of the sheet throughout the exposure time.

14. The transparent electroconductive film with a protective film according to claim 8, wherein the film substrate and the protective film are each formed of polyethylene terephthalate, and in each of the film substrate and the protective film, a thermal shrinkage ratio in a MD (machine direction) is a maximum thermal shrinkage ratio.

15. A transparent electroconductive film with a protective film, comprising:

a transparent electroconductive film including a laminate, which includes a film substrate, and at least an optical adjustment layer and a transparent conductive layer in this order on one main surface of the film substrate; and a protective film bonded to a main surface of the film substrate on a side opposite to the transparent conductive layer, wherein:

a moisture permeability of the optical adjustment layer is 1.0 g/m$^2$ ·day or less, the transparent electroconductive film and the protective film are thermally shrinkable in at least one direction in a main surface, an absolute value of a maximum thermal shrinkage ratio (%) of the transparent electroconductive film in a main surface is smaller than an absolute value of a maximum thermal shrinkage ratio (%) of the protective film in a main surface, and the difference between the absolute values is 0.05% to 0.6%, an interlayer adhesive strength between the protective film and the film substrate is 3N/50 mm or less, and an absolute value of curl developed when the transparent electroconductive film with a protective film is cut into a square or rectangular sheet with an area of 600 cm$^2$ or more, the sheet is heated at a temperature of 140° C. for 90 minutes, and subsequently exposed to an environment at a temperature of 25° C. and a relative humidity of 55% for 1 minute to 4 hours is 15 mm or less throughout exposure time.

16. The transparent electroconductive film with a protective film according to claim 15, wherein an absolute value of curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is 2.1% or less of a diagonal length of the sheet throughout exposure time.

17. The transparent electroconductive film with a protective film according to claim 15, wherein an interlayer adhesive strength between the protective film and the film substrate is smaller than an interlayer adhesive strength between any other pair of adjacent layers.

18. The transparent electroconductive film with a protective film according to claim 15, wherein a moisture permeability of the transparent electroconductive film at a temperature of 40° C. and a relative humidity of 90% is 1.0 g/m$^2$·day or less.

19. The transparent electroconductive film with a protective film according to claim 15, wherein a measured value of curl developed when the transparent electroconductive film with a protective film is cut into a square or rectangular sheet, the sheet is heated at a temperature of 140° C. for 90minutes, and subsequently exposed to an environment at a temperature of 25° C. and a relative humidity of 55% for 1 minute to 4 hours is a negative value as an average of measured values of curl at four corners of the sheet, throughout the exposure time, where the measured value of curl toward a transparent electroconductive film side is a positive value and the measured value of curl toward a protective film side is a negative value.

20. The transparent electroconductive film with a protective film according to claim 15, wherein curl developed when the transparent electroconductive film with a protective film is cut into a square or rectangular sheet, the sheet is heated at a temperature of 140° C. for 90 minutes, and subsequently exposed to an environment at a temperature of 25° C. and a relative humidity of 55% for 1 minute to 4 hours is in a direction toward a protective film side at four corners of the sheet throughout the exposure time.

21. The transparent electroconductive film with a protective film according to claim 15, wherein the film substrate and the protective film are each formed of polyethylene terephthalate, and in each of the film substrate and the protective film, a thermal shrinkage ratio in a MD (machine direction) is a maximum thermal shrinkage ratio.

* * * * *